(12) United States Patent
Hou et al.

(10) Patent No.: US 12,464,102 B2
(45) Date of Patent: Nov. 4, 2025

(54) METHOD AND APPARATUS FOR PROCESSING VIDEO, AND DISPLAY DEVICE

(71) Applicant: BOE Technology Group Co., Ltd., Beijing (CN)

(72) Inventors: Feng Hou, Beijing (CN); Dan Zhu, Beijing (CN); Guannan Chen, Beijing (CN); Yanhong Wu, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/281,573

(22) PCT Filed: Oct. 21, 2022

(86) PCT No.: PCT/CN2022/126793
§ 371 (c)(1),
(2) Date: Sep. 12, 2023

(87) PCT Pub. No.: WO2024/082288
PCT Pub. Date: Apr. 25, 2024

(65) Prior Publication Data
US 2025/0030823 A1 Jan. 23, 2025

(51) Int. Cl.
*H04N 9/73* (2023.01)
*G06T 7/90* (2017.01)
*G06V 20/40* (2022.01)
*G11B 27/02* (2006.01)
*G06V 10/74* (2022.01)

(52) U.S. Cl.
CPC ............. *H04N 9/73* (2013.01); *G06T 7/90* (2017.01); *G06V 20/49* (2022.01); *G11B 27/02* (2013.01); *G06T 2207/10016* (2013.01); *G06T 2207/10024* (2013.01); *G06T 2207/20212* (2013.01); *G06V 10/761* (2022.01)

(58) Field of Classification Search
CPC ... H04N 9/73; G06T 7/90; G06T 2207/10016; G06T 2207/10024; G06T 2207/20212; G06V 20/49; G06V 10/761; G11B 27/02
See application file for complete search history.

(56) References Cited

U.S. PATENT DOCUMENTS

2018/0174616 A1* 6/2018 Aguilar .................. G06V 20/41

* cited by examiner

*Primary Examiner* — Girumsew Wendmagegn
(74) *Attorney, Agent, or Firm* — XSENSUS LLP

(57) ABSTRACT

Provided is a method for processing a video. The method for processing the video can segment an initial video into a plurality of video clips, and calculate color temperatures of the plurality of video clips. For each target video clip in the plurality of video clips, the method can determine a color temperature adjustment coefficient of the target video clip based on a color temperature of the target video clip and a color balance correction coefficient thereof, and adjust a color temperature of at least one video frame in the target video clip by using the color temperature adjustment coefficient.

19 Claims, 7 Drawing Sheets

METHOD AND APPARATUS FOR PROCESSING VIDEO, AND DISPLAY DEVICE

CROSS-REFERENCE TO RELATED APPLICATION

This application is a U.S. national phase application based on PCT/CN2022/126793, filed on Oct. 21, 2022, the content of which is incorporated herein by reference in its entirety.

TECHNICAL FIELD

The present disclosure relates to the field of image processing technologies, and in particular, relates to a method and an apparatus for processing a video, and a display device.

BACKGROUND

In the field of image processing technologies, color temperature is one of benchmarks to evaluate the quality of image display. Due to the limitations of performance of an image acquisition device (for example, a camera) itself, an image of a target object captured by the image acquisition device has a certain degree of deviation from a true color of the target object, that is, a color temperature deviation exists in the image captured by the image acquisition device.

SUMMARY

The present disclosure provides a method and an apparatus for processing a video, and a display device. The technical solutions are as follows.

In one aspect, a method for processing a video is provided, and includes:
  segmenting a plurality of video frames in an initial video into a plurality of video clips, wherein each of the video clips includes one or more video frames, and the plurality of video frames is consecutive;
  determining, for each of the plurality of video clips, a color temperature of the video clip based on a color temperature of at least one video frame in the video clip;
  determining, for each target video clip in the plurality of video clips, a color temperature adjustment coefficient of the target video clip based on a color temperature of the target video clip and a color balance correction coefficient of the target video clip, wherein the color temperature adjustment coefficient is positively correlated with both the color temperature and the color balance correction coefficient of the target video clip, and a number of the target video clips in the initial video is less than or equal to a number of the plurality of video clips;
  adjusting, for each target video clip, a color temperature of each video frame in the target video clip by using the color temperature adjustment coefficient of the target video clip; and
  acquiring a target video by splicing at least one target video clip with the color temperature adjusted and a video clip other than the at least one target video clip according to a playing order.

Optionally, determining the color temperature of the video clip based on the color temperature of the at least one video frame in the video clip includes:
  performing space conversion on each video frame in the video clip;
  determining a color temperature of the video frame based on a mean value of a plurality of pixels in the video frame subjected to the space conversion on each channel; and
  determining the color temperature of the video clip based on a mean value of the color temperature of the at least one video frame in the video clip.

Optionally, performing the space conversion on each video frame in the video clip includes:
  converting each video frame in the video clip from a red-green-blue (RGB) color space to a hue-saturation-value (HSV) color space and a luminance-chrominance-chroma (YUV) color space separately;
  determining the color temperature of the video frame based on the mean value of the plurality of pixels in the video frame subjected to the space conversion on each channel includes:
  determining, for each video frame in the video clip, the color temperature of the video frame based on mean values of the plurality of pixels in the video frame on a Y channel, a U channel, and a V channel in the YUV color space as well as a mean value of the plurality of pixels on an S channel in the HSV color space, wherein the color temperature of the video frame is positively correlated with the mean values of the plurality of pixels in the video frame on the Y channel and the U channel, and is negatively correlated with the mean values of the plurality of pixels in the video frame on the V channel and the S channel.

Optionally, the color temperature CT of the video frame satisfies:

$$CT = \alpha \times \frac{|Y_{mean} \times U_{mean}|}{|C_{minus} \times V_{mean} \times S_{mean}|^{0.1}};$$

wherein $\alpha$ is a preset gain coefficient, $Y_{mean}$ is the mean value on the Y channel, $U_{mean}$ is the mean value on the U channel, $V_{mean}$ is the mean value on the V channel, $C_{minus}$ is an absolute value of a difference value between $U_{mean}$ and $V_{mean}$, and $S_{mean}$ is the mean value on the S channel.

Optionally, the plurality of video frames in the initial video are high-dynamic range (HDR) images, and the value of $\alpha$ is 5000.

Optionally, prior to determining the color temperature adjustment coefficient of the target video clip, the method further includes:
  determining the at least one target video clip from the plurality of video clips based on the color temperatures of the plurality of video clips,
  wherein the color temperature of each target video clip is beyond a preset color temperature range.

Optionally, the color temperature ranges from 6000 kelvin (K) to 7000 K.

Optionally, the color temperature adjustment coefficient of the target video clip includes an R channel adjustment coefficient $K_R$, a G channel adjustment coefficient $K_G$, and a B channel adjustment coefficient $K_B$,
  wherein the R channel adjustment coefficient $K_R$ satisfies: $K_R = CT' \times \beta_1 \times Avg\_gain'_R$;
  the G channel adjustment coefficient $K_G$ satisfies: $K_G = CT' \times \beta_2 \times Avg\_gain'_G$; and the B channel adjustment coefficient $K_B$ satisfies:
$K_B=CT'\times\beta_3\times Avg\_gain'_B$;
wherein $\beta_1$, $\beta_2$ and $\beta_3$ are all preset color temperature reference coefficients, CT' is the color temperature of the target video clip, $Avg\_gain'_R$ is a color balance correction coefficient of the target video clip on an R channel, $Avg\_gain'_G$ is a color balance correction coefficient of the target video clip on a G channel, and $Avg\_gain'_B$ is a color balance correction coefficient of the target video clip on a B channel.

Optionally, adjusting the color temperature of each video frame in the target video clip by using the color temperature adjustment coefficient of the target video clip includes:
  adjusting, for each video frame in the target video clip, an R pixel value of each pixel in the video frame by using the R channel adjustment coefficient $K_R$;
  adjusting, for each video frame in the target video clip, a G pixel value of each pixel in the video frame by using the G channel adjustment coefficient $K_G$; and
  adjusting, for each video frame in the target video clip, a B pixel value of each pixel in the video frame by using the B channel adjustment coefficient $K_B$.

Optionally, $Avg\_gain'_R$ is a mean value of a color balance correction coefficient of at least one video frame in the target video clip on the R channel;
  $Avg\_gain'_G$ is a mean value of a color balance correction coefficient of the at least one video frame in the target video clip on the G channel; and
  $Avg\_gain'_B$ is a mean value of a color balance correction coefficient of the at least one video frame in the target video clip on the B channel.

Optionally, a color balance correction coefficient $gain_R$ of each video frame on the R channel satisfies: $gain_R=K/R_{avg}+a$;
  a color balance correction coefficient $gain_G$ of each video frame on the G channel satisfies: $gain_G=K/G_{avg}+b$; and
  a color balance correction coefficient $gain_B$ of each video frame on the B channel satisfies: $gain_B=K/B_{avg}+C$;
  wherein $R_{avg}$ is a mean value of R pixel values of a plurality of pixels in the video frame, $G_{avg}$ is a mean value of G pixel values of the plurality of pixels in the video frame, $B_{avg}$ is a mean value of B pixel values of the plurality of pixels in the video frame, a, b, and c are preset reference deviation values, and K is a mean value of $R_{avg}$, $G_{avg}$, and $B_{avg}$.

Optionally, the plurality of video frames in the initial video are HDR images, the value of a is 20, the value of b is 10, and the value of c is 0.

Optionally, segmenting the plurality of video frames in the initial video into the plurality of video clips includes:
  sequentially calculating a similarity between each video frame and a previous video frame according to the playing order of the plurality of video frames in the initial video; and
  segmenting the initial video into the plurality of video clips based on the calculated similarity between every two adjacent video frames.

Optionally, each video frame in the initial video includes a plurality of image blocks, and sequentially calculating the similarity between each video frame and the previous video frame according to the playing order of the plurality of video frames in the initial video includes:
  determining at least one target image block in each video frame in the initial video, wherein a number of the at least one target image block is less than a number of the plurality of image blocks; and
  sequentially calculating a similarity between at least one target image block in each video frame and at least one target image block in a previous video frame according to the playing order of the plurality of video frames in the initial video,
  wherein a position of the at least one target image block in each video frame is a same as a position of the at least one target image block in the previous video frame.

Optionally, prior to sequentially calculating the similarity between each video frame and the previous video frame according to the playing order of the plurality of video frames in the initial video, the method further includes:
  acquiring the plurality of video frames by performing dimensionality reduction processing on each initial video frame in the initial video.

Optionally, sequentially calculating the similarity between each video frame and the previous video frame includes:
  determining, for each of the plurality of video frames, a structural similarity between the video frame and the previous video frame based on a mean value of image data of the video frame and a mean value of image data of the previous video frame, a standard deviation of the image data of the video frame and a standard deviation of the image data of the previous video frame, and a covariance between the image data of the video frame and the image data of the previous video frame; and
  determining the similarity between the video frame and the previous video frame based on the structural similarity between the video frame and the previous video frame.

Optionally, the method further includes: sequentially calculating the similarity between each video frame and the previous video frame by using a structural similarity (SSIM) algorithm.

In another aspect, an apparatus for processing a video is provided, and includes:
  a segmenting module, configured to segment a plurality of video frames in an initial video into a plurality of video clips, wherein each of the plurality of video clips includes one or more video frames, and the plurality of video frames is continuous;
  a first determining module, configured to determine, for each of the plurality of video clips, a color temperature of the video clip based on a color temperature of at least one video frame in the video clip;
  a second determining module, configured to determine, for each target video clip in the plurality of video clips, a color temperature adjustment coefficient of the target video clip based on a color temperature of the target video clip and a color balance correction coefficient of the target video clip, wherein the color temperature adjustment coefficient is positively correlated with both the color temperature and the color balance correction coefficient, and a number of the target video clips in the initial video is less than or equal to a number of the plurality of video clips;
  a processing module, configured to adjust, for each target video clip, a color temperature of each video frame in the target video clip by using the color temperature adjustment coefficient of the target video clip; and
  a splicing module, configured to acquire a target video by splicing at least one target video clip with the color temperature adjusted and a video clip other than the at least one target video clip according to a playing order.

Optionally, the first determining module is configured to:

perform space conversion on each video frame in the video clip;
determine a color temperature of the video frame based on a mean value of a plurality of pixels in the video frame subjected to the space conversion on each channel; and
determine the color temperature of the video clip based on a mean value of the color temperature of the at least one video frame in the video clip.

Optionally, the first determining module is configured to:
convert each video frame in the video clip from an RGB color space to an HSV color space and a YUV color space separately;
determine, for each video frame in the video clip, the color temperature of the video frame based on mean values of the plurality of pixels in the video frame on a Y channel, a U channel, and a V channel in the YUV color space as well as a mean value of the plurality of pixels on an S channel in the HSV color space, wherein the color temperature of the video frame is positively correlated with the mean values of the plurality of pixels in the video frame on the Y channel and the U channel, and is negatively correlated with the mean values of the plurality of pixels in the video frame on the V channel and the S channel.

Optionally, the color temperature CT of the video frame satisfies:

$$CT = \alpha \times \frac{|Y_{mean} \times U_{mean}|}{|C_{minus} \times V_{mean} \times S_{mean}|^{0.1}};$$

wherein $\alpha$ is a preset gain coefficient, $Y_{mean}$ is the mean value on the Y channel, $U_{mean}$ is the mean value on the U channel, $V_{mean}$ is the mean value on the V channel, $C_{minus}$ is an absolute value of a difference value between $U_{mean}$ and $V_{mean}$, and $S_{mean}$ is the mean value on the S channel.

Optionally, the plurality of video frames in the initial video are HDR images, and the value of $\alpha$ is 5000.

Optionally, the apparatus for processing the video further includes: a third determining module, configured to determine the at least one target video clip from the plurality of video clips based on the color temperatures of the plurality of video clips,
wherein the color temperature of each target video clip is beyond a preset color temperature range.

Optionally, the color temperature ranges from 6000 K to 7000 K.

Optionally, the color temperature adjustment coefficient of the target video clip includes an R channel adjustment coefficient $K_R$, a G channel adjustment coefficient $K_G$, and a B channel adjustment coefficient $K_B$,
wherein the R channel adjustment coefficient $K_R$ satisfies: $K_R = CT' \times \beta_1 \times Avg\_gain'_R$;
the G channel adjustment coefficient $K_G$ satisfies: $K_G = CT' \times \beta_2 \times Avg\_gain'_G$; and
the B channel adjustment coefficient $K_B$ satisfies: $K_B = CT' \times \beta_3 \times Avg\_gain'_B$;
wherein $\beta_1$, $\beta_2$ and $\beta_3$ are all preset color temperature reference coefficients, CT' is the color temperature of the target video clip, $Avg\_gain'_R$ is a color balance correction coefficient of the target video clip on an R channel, $Avg\_gain'_G$ is a color balance correction coefficient of the target video clip on a G channel, and $Avg\_gain'_B$ is a color balance correction coefficient of the target video clip on a B channel.

Optionally, the processing module is configured to:
adjust, for each video frame in the target video clip, an R pixel value of each pixel in the video frame by using the R channel adjustment coefficient $K_R$;
adjust, for each video frame in the target video clip, a G pixel value of each pixel in the video frame by using the G channel adjustment coefficient $K_G$; and
adjust, for each video frame in the target video clip, a B pixel value of each pixel in the video frame by using the B channel adjustment coefficient $K_B$.

Optionally, $Avg\_gain'_R$ is a mean value of a color balance correction coefficient of at least one video frame in the target video clip on the R channel;
$Avg\_gain'_G$ is a mean value of a color balance correction coefficient of the at least one video frame in the target video clip on the G channel; and
$Avg\_gain'_B$ is a mean value of a color balance correction coefficient of the at least one video frame in the target video clip on the B channel.

Optionally, a color balance correction coefficient $gain_R$ of each video frame on the R channel satisfies: $gain_R = K/R_{avg} + a$;
a color balance correction coefficient $gain_B$ of each video frame on the G channel satisfies: $gain_G = K/G_{avg} + b$; and
a color balance correction coefficient $gain_B$ of each video frame on the B channel satisfies: $gain_B = K/B_{avg} + c$;
wherein $R_{avg}$ is a mean value of R pixel values of a plurality of pixels in the video frame, $G_{avg}$ is a mean value of G pixel values of the plurality of pixels in the video frame, $B_{avg}$ is a mean value of B pixel values of the plurality of pixels in the video frame, a, b, and c are preset reference deviation values, and K is a mean value of $R_{avg}$, $G_{avg}$, and $B_{avg}$.

Optionally, a plurality of video frames in the initial video are HDR images, the value of a is 20, the value of b is 10, and the value of c is 0.

Optionally, the segmenting module is configured to:
sequentially calculate a similarity between each video frame and a previous video frame according to the playing order of the plurality of video frames in the initial video; and
segment the initial video into the plurality of video clips based on the calculated similarity between every two adjacent video frames.

Optionally, each video frame in the initial video includes a plurality of image blocks, and the segmenting module is configured to:
determine at least one target image block in each video frame in the initial video, wherein a number of the at least one target image block is less than a number of the plurality of image blocks; and
sequentially calculate a similarity between at least one target image block in each video frame and at least one target image block in a previous video frame according to the playing order of the plurality of video frames in the initial video,
wherein a position of the at least one target image block in each video frame is a same as a position of the at least one target image block in the previous video frame.

Optionally, the apparatus for processing the video further includes: a dimensionality reducing module, configured to acquire the plurality of video frames by performing dimensionality reduction processing on each initial video frame in the initial video before the segmenting module sequentially calculates the similarity between each video frame and the previous video frame according to the playing order of the plurality of video frames in the initial video.

Optionally, the segmenting module is configured to:
determine, for each of the plurality of video frames, a structural similarity between the video frame and the previous video frame based on a mean value of image data of the video frame and a mean value of image data of the previous video frame, a standard deviation of the image data of the video frame and a standard deviation of the image data of the previous video frame, and a covariance between the image data of the video frame and the image data of the previous video frame; and
determine the similarity between the video frame and the previous video frame based on the structural similarity between the video frame and the previous video frame.

In yet another aspect, a display device is provided. The display device includes a display screen, a processor, and a memory storing at least one instruction, wherein the at least one instruction, when loaded and executed by the processor, causes the processor to perform the method for processing the video according to the above aspect.

In still another aspect, a computer-readable storage medium is provided. The computer-readable storage medium stores at least one instruction, wherein the at least one instruction, when loaded and executed by a processor, causes the processor to perform the method for processing the video according to the above aspect.

In still another aspect, a computer program product is provided. The computer program product includes at least one computer instruction, wherein the at least one instruction, when loaded and executed by a processor, causes the processor to perform the method for processing the video according to the above aspect.

BRIEF DESCRIPTION OF DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and those skilled in the art may still derive other drawings from these accompanying drawings without creative efforts.

DETAILED DESCRIPTION

For clearer descriptions of the objectives, technical solutions, and advantages of the present disclosure, the embodiments of the present disclosure are described in detail hereinafter with reference to the accompanying drawings.

In the related art, in order to improve the display effect of an image, a color temperature adjustment coefficient is used to adjust a color temperature of the image.

Figure 1:
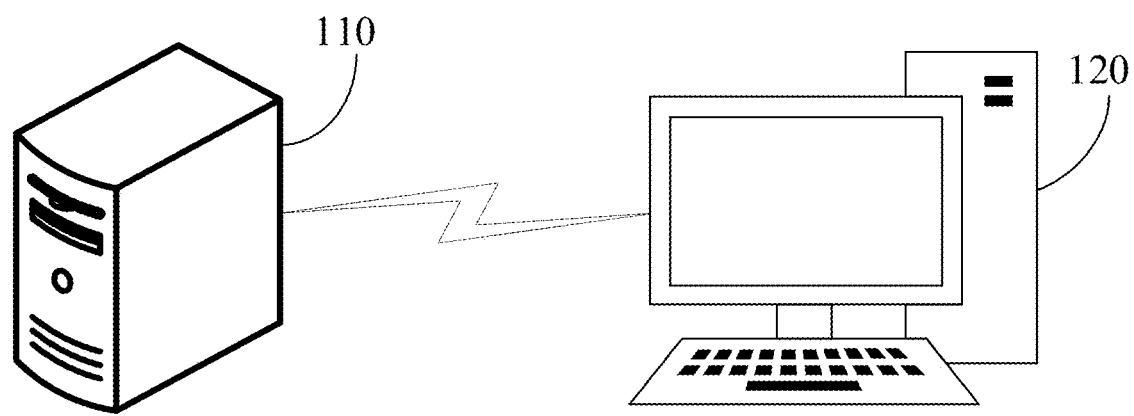
FIG. 1 is a schematic structural diagram of a system for processing a video according to some embodiments of the present disclosure.

FIG. 1 is a schematic structural diagram of a system for processing a video according to some embodiments of the present disclosure. Referring to FIG. 1, the system includes a server 110 and a terminal 120. A wired or wireless communication connection is established between the server 110 and the terminal 120. Optionally, the server 110 may be a stand-alone physical server, a server cluster, or a distributed system composed of a plurality of physical servers. The terminal 120 may be a personal computer (PC), a vehicle-mounted terminal, a tablet computer, a smart phone, a wearable device, or a terminal such as an intelligent robot that has a display screen and has data calculation, processing and storage capabilities.

In the embodiments of the present disclosure, the terminal 120 in the system may be configured to acquire an initial video and send the initial video to the server 110. The server 110 may further process and analyze the initial video, and send a target video acquired by the processing to the terminal 120 for display by the terminal 120. That is, the terminal 120 may be a display device.

Optionally, a browser or a video application may be installed in the terminal 120, and the server 110 may be a background server of a video website or the video application.

It can be understood that the terminal 120 may also have capabilities of processing and analyzing the initial video, and can adjust a color temperature of the initial video. Correspondingly, the system for processing the video may not include the server 110.

Figure 2:
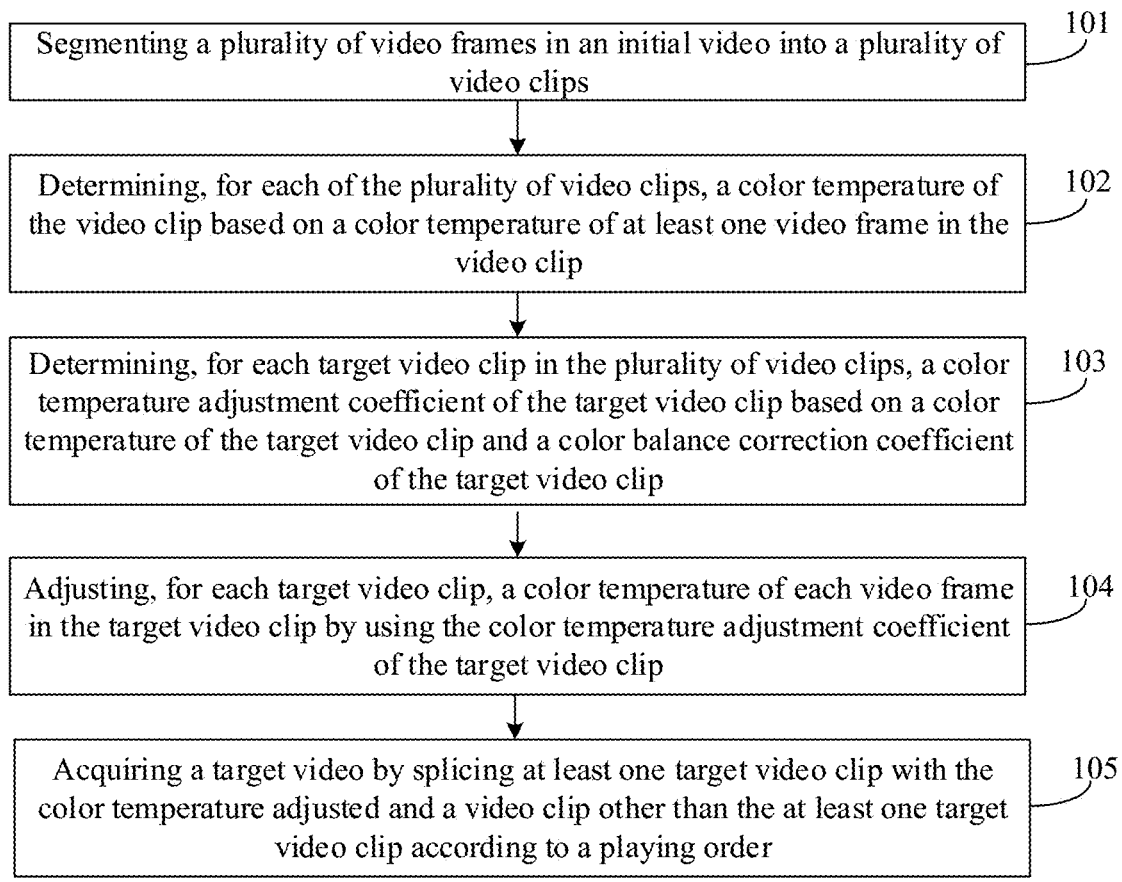
FIG. 2 is a flowchart of a method for processing a video according to some embodiments of the present disclosure.

FIG. 2 is a flowchart of a method for processing a video according to some embodiments of the present disclosure. The method may be applicable to the server 110 or the terminal 120 in the scene shown in FIG. 1. The following takes an example in which the method for processing the video is applicable to the terminal for illustration. As shown in FIG. 2, the method includes the following steps.

In 101, a plurality of video frames in an initial video is segmented into a plurality of video clips.

In the embodiments of the present disclosure, after acquiring the initial video, the terminal can segment the plurality of video frames into the plurality of video clips based on similarities of the video frames in the initial video, wherein each video clip includes one or more video frames. In the case that each video clip includes a plurality of video frames, the plurality of video frames is consecutive. Each video clip may also be called one scene, and correspondingly, the process of segmenting into the video clips may also be called scene segmentation.

It can be understood that the plurality of video frames in the initial video is acquired by an image acquisition device (such as a camera), and the initial video may contain a plurality of different scenes. Color temperatures of the video frames in the different scenes are different, and color temperatures of the video frames in the same scene may be the same. Thus, before processing the initial video, the terminal may perform scene segmentation on the initial video. Therefore, the terminal may further conveniently process the plurality of video frames based on the scenes to which the video frames belong in the initial video.

Optionally, an image similarity algorithm may be pre-stored in the terminal. Based on the image similarity algorithm, the terminal can calculate a similarity between each video frame and a previous video frame, such that the plurality of video frames in the initial video is segmented into the plurality of video clips. For example, the image similarity algorithm may be an SSIM algorithm, cosine similarity algorithm, or Euclid distance (also called Euclidean distance) algorithm.

In 102, for each of the plurality of video clips, a color temperature of the video clip is determined based on a color temperature of at least one video frame in the video clip.

In the embodiments of the present disclosure, for each video clip, the terminal can first calculate a color temperature of each video frame in the video clip, and then, determine the color temperature of the video clip based on the color temperature of the at least one video frame in the video clip.

For example, in the case that the video clip only includes one video frame, the terminal may directly determine the color temperature of the video frame as the color temperature of the video clip. In the case that the video clip includes at least two video frames, the terminal may determine a mean value of color temperatures of the at least two video frames as the color temperature of the video clip. Alternatively, the terminal may determine a median value of the color temperatures of the at least two video frames in the video clip as the color temperature of the video clip. Alternatively, the terminal may determine a mode value of the color temperatures of the at least two video frames in the video clip as the color temperature of the video clip.

In 103, for each target video clip in the plurality of video clips, a color temperature adjustment coefficient of the target video clip is determined based on a color temperature of the target video clip and a color balance correction coefficient of the target video clip.

In the embodiments of the present disclosure, an image processing algorithm for calculating a color balance correction coefficient of a video frame is pre-stored in the terminal. For each target video clip, the terminal can first calculate a color balance correction coefficient of at least one video frame in the target video clip by using the image processing algorithm, and then determine the color balance correction coefficient of the target video clip based on the color balance correction coefficient of the at least one video frame. The color temperature adjustment coefficient of the target video clip is positively correlated with both the color temperature of the target video clip and the color balance correction coefficient of the target video clip.

It can be understood that the number of the target video clips in the initial video may be less than or equal to the number of the plurality of video clips. That is, the terminal may process some or all of the video clips. Optionally, the terminal may determine at least one target video clip from the plurality of video clips based on an image feature of the plurality of video clips. The image feature may include at least one of the following features: color temperature, saturation, definition, color, and the like.

Optionally, the image processing algorithm pre-stored in the terminal may be one of the following algorithms: a gray world algorithm, a perfect reflection algorithm, a dynamic threshold algorithm, an automatic white balance algorithm based on color temperature estimation, and the like.

In 104, for each target video clip, a color temperature of each video frame in the target video clip is adjusted by using the color temperature adjustment coefficient of the target video clip.

In the embodiments of the present disclosure, in an RGB color space, each pixel in each video frame in the target video clip includes channel values of three color channels, namely a red (R) channel, a green (G) channel, and a blue (B) channel. The channel values of these three channels may also be called an R pixel value, a G pixel value, and a B pixel value. The terminal may adjust the color temperature of the video frame by adjusting the R pixel value, G pixel value, and B pixel value of each pixel in the video frame.

It can be understood that color casts (namely, deviations of the color temperatures) of the video frames in the same target video clip (namely, in the same scene) are the same, such that the terminal may adjust the color temperature of the at least one video frame in the target video clip by using the same color temperature adjustment coefficient, so as to implement color balance correction (namely, white balance correction) of the at least one video frame. Therefore, a better processing effect of the video frames in a scene corresponding to the target video clip can be ensured, thereby ensuring a better display effect of the processed video.

In 105, a target video is acquired by splicing at least one target video clip with the color temperature adjusted and a video clip other than the at least one target video clip according to a playing order.

In the embodiments of the present disclosure, after completing the color temperature adjustment of the at least one target video clip, the terminal can splice the at least one video clip, as well as the at least one video clip which is not subjected to color temperature adjustment among the plurality of video clips acquired by clip segmenting of the initial video, according to the playing order, so as to acquire the target video. That is, in the target video, some video clips are processed by the color temperature adjustment, and some video clips are not subjected to the color temperature adjustment. Therefore, a better display effect of the target video can be ensured.

In summary, a method for processing a video is provided by the embodiments of the present disclosure. In the method for processing the video, a terminal can segment an initial video into a plurality of video clips, and calculate color temperatures of the plurality of video clips. For each target video clip in the plurality of video clips, the terminal can determine a color temperature adjustment coefficient of the target video clip based on a color temperature of the target video clip and a color balance correction coefficient thereof, and adjust a color temperature of at least one video frame in the target video clip by using the color temperature adjustment coefficient. Thus, a better color temperature adjustment effect of each video clip can be ensured, thereby ensuring a better display effect of the processed video.

Figure 3:
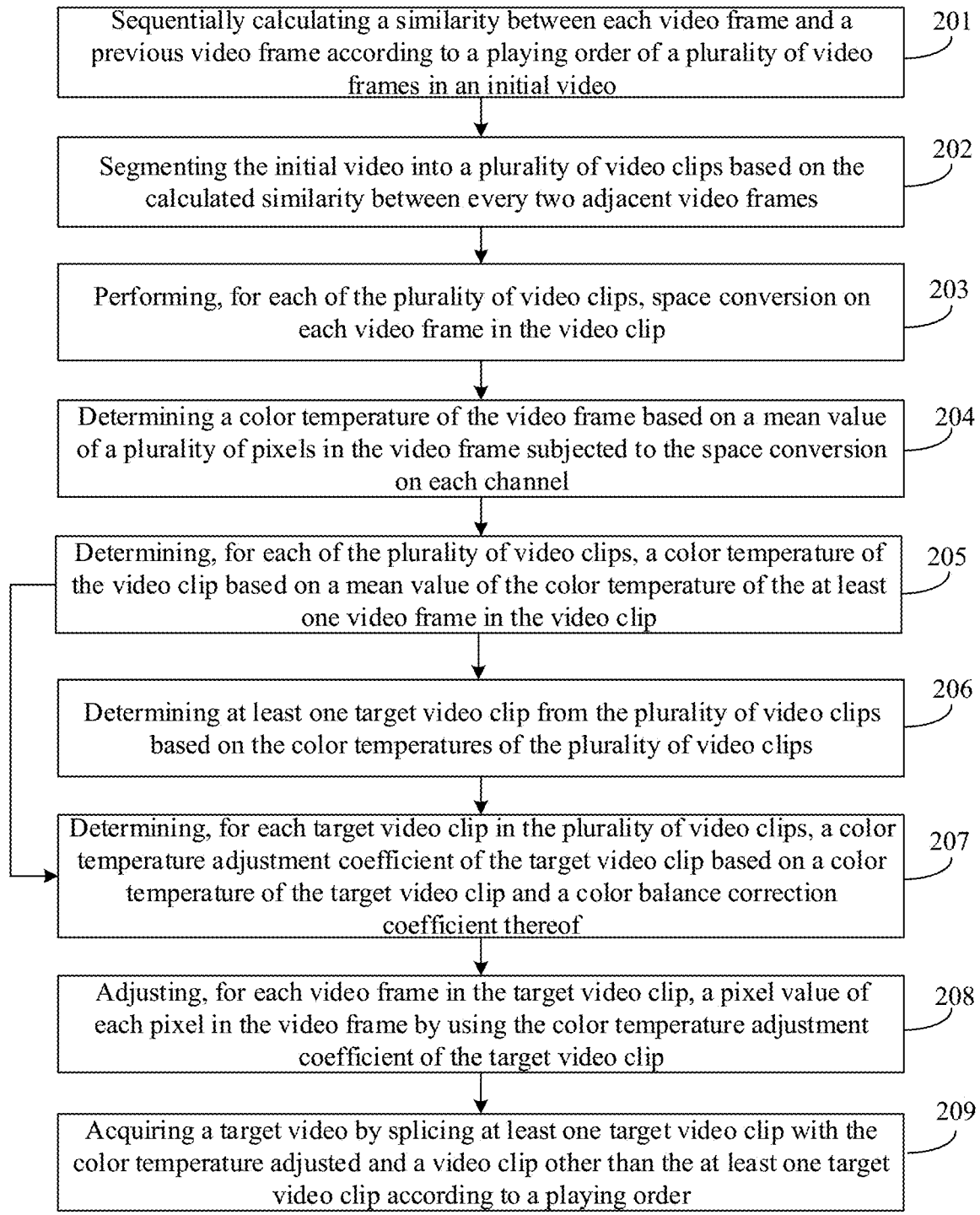
FIG. 3 is a flowchart of another method for processing a video according to some embodiments of the present disclosure.

FIG. 3 is a flowchart of another method for processing a video according to some embodiments of the present disclosure. The method may be applicable to the server 110 or the terminal 120 in the scene shown in FIG. 1. The following takes an example in which the method for processing the video is applicable to the terminal for illustration. As shown in FIG. 3, the method includes the following steps.

In 201, a similarity between each video frame and a previous video frame is sequentially calculated according to a playing order of a plurality of video frames in an initial video.

In the embodiments of the present disclosure, an image similarity algorithm is pre-stored in the terminal. After acquiring the initial video, the terminal can sequentially calculate the similarity between each video frame and the previous video frame by using the image similarity algorithm.

It can be understood that when calculating the similarity between each video frame and the previous video frame by using the image similarity algorithm, the terminal may determine the similarity between the video frame and the previous video frame based on a structural similarity between the video frame and the previous video frame. Optionally, the terminal may determine the structural similarity between each video frame and the previous video frame based on a mean value of image data of the video frame and a mean value of image data of the previous video frame, a standard deviation of the image data of the video frame and a standard deviation of the image data of the previous video frame, and a covariance between the image data of the video frame and the image data of the previous video frame.

Optionally, the terminal may sequentially calculate the structural similarity between each video frame and the previous video frame by using an SSIM algorithm, and further determine the similarity between each video frame and the previous video frame. The structural similarity SSIM (X, Y) between the video frame X and the previous video frame Y satisfies:

$$SSIM(X, Y) = \frac{(2\mu_x\mu_y + c_1)(2\sigma_{xy} + c_2)}{(\mu_x^2 + \mu_y^2 + c_1) + (\sigma_x^2 + \sigma_y^2 + c_2)};$$

wherein $\mu_x$ represents a mean value of image data of the video frame X, $\mu_y$ represents a mean value of image data of the video frame Y, $\sigma_x$ represents a standard deviation of the image data of the video frame X, $\sigma_y$ represents a standard deviation of the image data of the video frame Y, $\sigma_{xy}$ represents a covariance between the image data of the video frame X and the image data of the video frame Y, and $c_1$ and $c_2$ are preset constants. The range of the structural similarity between the video frame X and the previous video frame Y may satisfy: 0≤SSIM(X,Y)≤1. The closer the structural similarity between the two video frames is to 1, the more similar the two video frames are.

It can be understood that the structural similarity of video frames in the same scene is higher, the structural similarity of video frames in different scenes is lower. Thus, the structural similarity of two adjacent video frames in the initial video may be calculated by using the SSIM algorithm, such that the terminal may conveniently perform scene segmentation on the initial video based on the structural similarity, and a better scene segmentation effect is ensured.

As a first possible implementation, each video frame in the initial video may include a plurality of image blocks, and the terminal may determine at least one target image block in each video frame in the initial video, and sequentially calculate the similarity between at least one target image block in each video frame and at least one target image block in the previous video frame according to the playing order of the plurality of video frames in the initial video.

The number of the at least one target image block in each video frame is less than that of the plurality of image blocks, and the position of the at least one target image block, selected in each video frame, in the video frame is the same as and is in one-to-one correspondence to that of the at least one target image block, selected in the previous video frame, in the previous video frame.

In this implementation, the terminal only needs to calculate a similarity between partial regions in the two video frames (namely, the target image blocks, corresponding to each other one by one, in the two video frames), and determines the similarity of the partial regions as the similarity of the two video frames. Therefore, the computational complexity in calculating the similarity can be effectively reduced, and the computational efficiency of the similarity can be improved. The similarity of the target image blocks in the two adjacent video frames may be calculated by the SSIM algorithm.

As a second possible implementation, the terminal may acquire the plurality of video frames by performing dimensionality reduction processing on each initial video frame in the initial video, and then, calculate a similarity between each video frame and a previous video frame in the plurality of video frames by using an image similarity algorithm (such as the SSIM algorithm).

In the embodiments of the present disclosure, a data dimensionality reduction algorithm may be pre-stored in the terminal, and the terminal may perform dimensionality reduction processing on each initial video frame in the initial video by using the data dimensionality reduction algorithm, such that image data of the initial video frame is converted from high dimensionality to low dimensionality, thereby reducing a data size of each initial video frame. The data dimensionality reduction algorithm may be a principal component analysis (PCA) algorithm, a t-distributed stochastic neighbor embedding (t-SNE) algorithm, a neural network algorithm, or the like.

It can be understood that calculating the similarity by the terminal using the video frame subjected to the dimensionality reduction processing can effectively reduce the complexity in calculating the similarity, and improve the computational efficiency.

In 202, the initial video is segmented into a plurality of video clips based on the calculated similarity between every two adjacent video frames.

After calculating the similarity between every two adjacent video frames in the initial video, the terminal may sequentially traverse each video frame according to the playing order of the plurality of video frames in the initial video. For each traversed video frame, in the case that the similarity between the video frame and the previous video frame is greater than a similarity threshold, the terminal may segment the video frame and the previous video frame into the same video clip (namely, the same scene). In the case that the similarity between the video frame and the previous video frame is not greater than the similarity threshold, the terminal may segment the video frame and the previous video frame into different video clips.

Exemplarily, for each video frame traversed by the terminal, in the case that the similarity between the video frame and the previous video frame is greater than the similarity threshold, the terminal may determine that the two video frames belong to the same video clip, and continue to traverse the video frames. In the case that the similarity between the video frame and the previous video frame is less than or equal to the similarity threshold, the terminal may record a frame number of the currently traversed video frame. After completely traversing the video frames, the terminal may determine a video frame indicated by each recorded frame number as a first video frame of a video clip.

Based on the above segmenting method, the terminal can segment the initial video into the plurality of video clips. Each video clip includes at least one consecutive video frame. Each video clip may also be called a scene, and the above process of segmenting into the video clips may also be called scene segmentation.

It can be understood that the plurality of video frames in the initial video is acquired by an image acquisition device (such as a camera), and the initial video may contain a plurality of different scenes, wherein color temperatures of the video frames in the different scenes are different, and color temperatures of the video frames in the same scene may be the same. Thus, before processing the initial video, the terminal may perform scene segmentation on the initial video. Therefore, the terminal may further conveniently process the plurality of video frames based on the scenes to which the video frames belong in the initial video.

Figure 4:
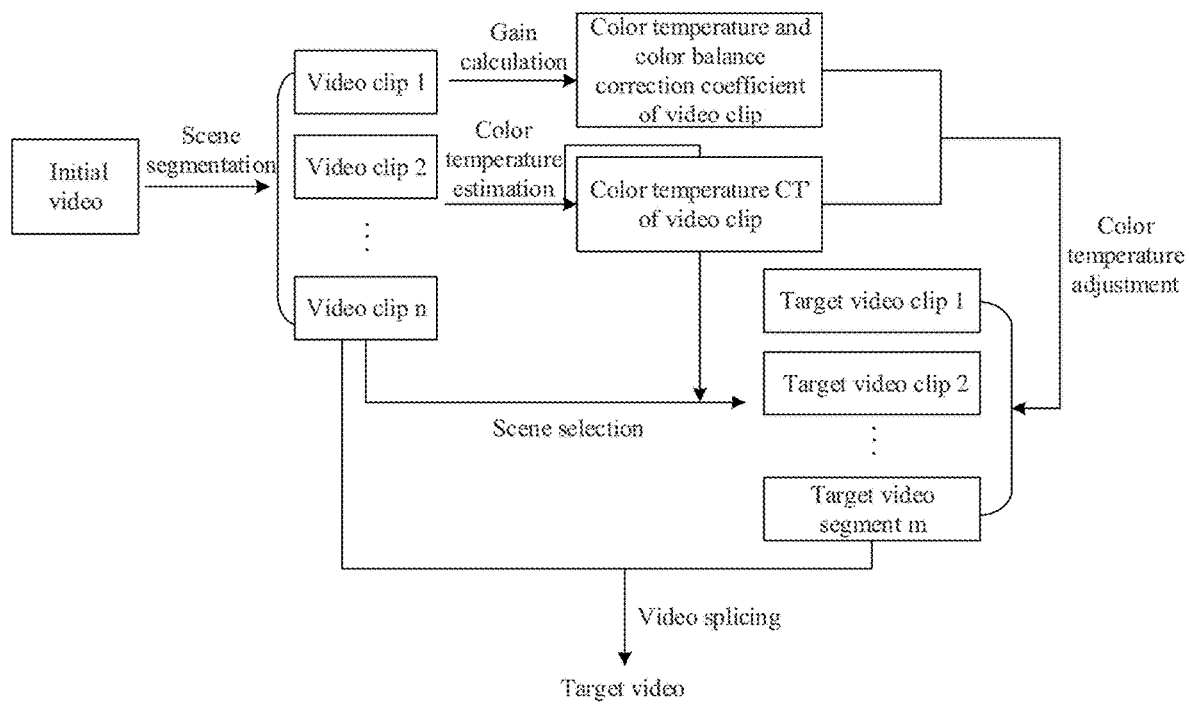
FIG. 4 is a schematic diagram of processing of an initial video by a terminal according to some embodiments of the present disclosure.

Exemplarily, referring to FIG. 4, after the terminal performs the scene segmentation on the initial video, n video clips, namely, n scenes, are acquired, wherein n is an integer greater than or equal to 1.

It can be understood that a similarity threshold referenced when the video clips are acquired by the terminal through segmenting may be set according to the requirements of application scenes. For example, in the case that the terminal calculates the similarity between every two adjacent video frames by using the SSIM algorithm, the value of the similarity threshold may be 0.5.

In 203, for each of the plurality of video clips, space conversion is performed on each video frame in the video clip.

In the embodiments of the present disclosure, in order to conveniently determine a color temperature of each video frame in the video clip, the terminal may first perform color space conversion on each video frame in each video clip. A color space of each video frame in the video clip is generally an RGB color space, while an HSV color space and a YUV color space are more convenient for the terminal to determine the color temperature of each video frame. Thus, for each of the plurality of video clips, the terminal may convert (namely, map) each video frame in the video clip from the RGB color space to the HSV color space and the YUV color space separately. In the HSV color space, H represents hue, S represents saturation, and V represents value. In the YUV color space, Y represents luminance (namely, a gray level), and U and V represent chrominance.

In 204, a color temperature of the video frame is determined based on a mean value of a plurality of pixels in the video frame subjected to the space conversion on each channel.

In the embodiments of the present disclosure, for each video frame in the video clip, after performing the space conversion on the video frame, the terminal may calculate the mean value of the plurality of pixels in the video frame subjected to the space conversion on each channel, and then, determine the color temperature of the video frame based on the plurality of calculated mean values.

For example, for each video frame in a video clip, after converting the video frame from the RGB color space to the YUV color space and the HSV color space, the terminal can first calculate mean values of the plurality of pixels in the video frame on a Y channel, a U channel, and a V channel in the YUV color space as well as a mean value of the plurality of pixels on an S channel in the HSV color space, and then, determine the color temperature of the video frame based on the plurality of calculated mean values. The color temperature CT of the video frame may satisfy:

$$CT = \alpha \times \frac{|Y_{mean} \times U_{mean}|}{|C_{minus} \times V_{mean} \times S_{mean}|^{0.1}}, \quad \text{Equation (1)}$$

wherein $\alpha$ is a preset gain coefficient, $Y_{mean}$ is the mean value on the Y channel, $U_{mean}$ is the mean value on the U channel, $V_{mean}$ is the mean value on the V channel, $C_{minus}$ is an absolute value of a difference value between $U_{mean}$ and $V_{mean}$, and $S_{mean}$ is the mean value on the S channel. The value of the preset gain coefficient $\alpha$ may be determined based on an image type of the video frame. For example, in the case that the plurality of video frames in the initial video are HDR images, the value of $\alpha$ may be 5000.

With reference to the above equation (1), it can be seen that the color temperature CT of the video frame is positively correlated with both the mean value $Y_{mean}$ on the Y channel and the mean value $U_{mean}$ on the U channel of the plurality of pixels in the video frame, and negatively correlated with both the mean value $V_{mean}$ on the V channel and the mean value $S_{mean}$ on the S channel of the plurality of pixels in the video frame.

It can be understood that in the case that the color temperature of the video frame is higher, the color perception of the video frame is relatively cool-toned. In the case that the color temperature of the video frame is lower, the color perception of the video frame is relatively warm-toned.

It can also be understood that with reference to the above equation (1), the terminal calculates the color temperature by using the mean values of the three channels in the YUV color space and the mean value on the S channel in the HSV color space. Optionally, the terminal may also calculate the color temperature by using the mean values of the three channels in the YUV color space and the mean value of the H channel or the V channel in the HSV color space, which is not limited in the embodiments of the present disclosure.

In 205, for each of the plurality of video clips, a color temperature of the video clip is determined based on a mean value of a color temperature of at least one video frame in the video clip.

In the embodiments of the present disclosure, for each video clip in the initial video, after calculating the color temperature of each video frame in the video clip, the terminal may calculate the mean value of the color temperature of the at least one video frame in the video clip, so as to acquire the color temperature of the video clip.

It can be understood that the illumination intensity in the environment, the color from a light source and other factors may affect the color temperature of the video frame. Therefore, for any two video clips in the plurality of video clips, in the case that a plurality of video frames in the two video clips is acquired by an image acquisition device in the same environment, the color temperatures of the two video clips may be the same or closer. In the case that the plurality of video frames in the two video clips is acquired by the image acquisition device in different environments, the color temperatures of the two video clips may be different.

It can be understood that the above 203, 204, and 205 may be called a color temperature estimation process of the video clips. Referring to FIG. 4, the terminal may estimate color temperatures of n video clips after the scene segmentation to determine the color temperatures of the n video clips.

Exemplarily, in the case that the value of n is 18, the color temperatures of the 18 video clips may be as shown in Table 1. The color temperature distribution of the 18 video clips may be shown in FIG. 5. In a distribution diagram shown in FIG. 5, the horizontal axis represents the sequence number of each video clip in the initial video, and the vertical axis represents the color temperature.

TABLE 1

| Video Clip | Color Temperature |
| --- | --- |
| Video clip 0 | 5720.20909 |
| Video clip 1 | 5240.31785 |
| Video clip 2 | 5275.58894 |
| Video clip 3 | 5235.78897 |
| Video clip 4 | 3466.36371 |
| Video clip 5 | 3492.96300 |
| Video clip 6 | 3535.09971 |
| Video clip 7 | 3423.00837 |
| Video clip 8 | 3830.70259 |
| Video clip 9 | 8069.46948 |
| Video clip 10 | 7000.11555 |
| Video clip 11 | 6210.20417 |
| Video clip 12 | 8727.09987 |
| Video clip 13 | 6549.30958 |
| Video clip 14 | 6130.87969 |
| Video clip 15 | 3526.23534 |
| Video clip 16 | 3846.06156 |
| Video clip 17 | 3527.52028 |

Figure 5:
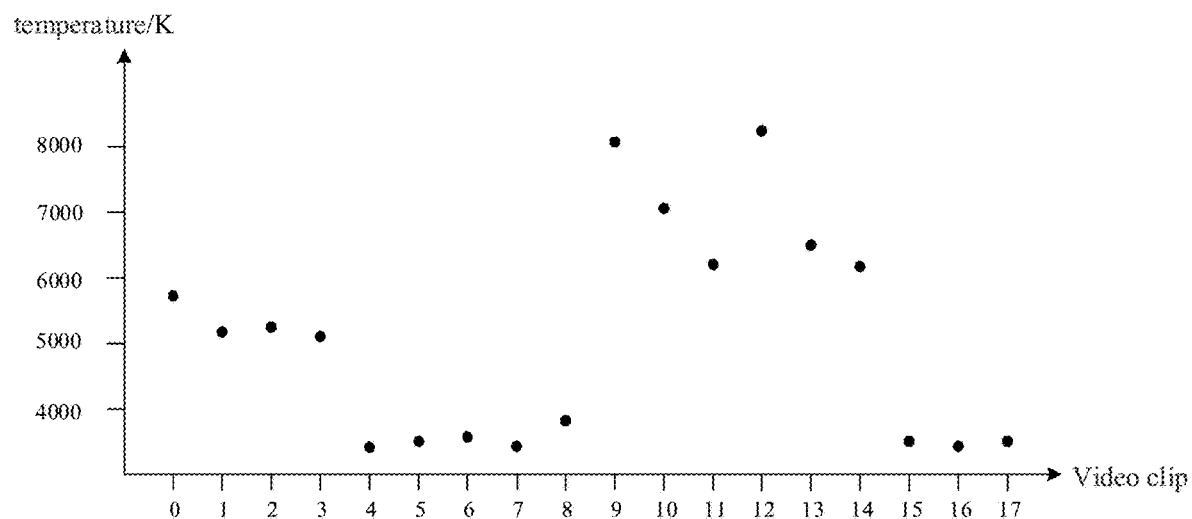
FIG. 5 is a color temperature distribution diagram of a video clip according to some embodiments of the present disclosure.

Referring to Table 1 and FIG. 5, it can be seen that the color temperatures of any two of the 18 video clips are not exactly the same, but there are video clips with similar color temperatures, such as video clip 1, video clip 2, and video clip 3. Therefore, it may be determined that the three video clips are acquired by the image acquisition device in the same environment.

In 206, at least one target video clip is determined from the plurality of video clips based on the color temperatures of the plurality of video clips.

In the embodiments of the present disclosure, the terminal may select at least one target video clip whose color temperature needs to be adjusted from the plurality of video clips based on an expected display effect of the processed video clips. The number of the target video clips in the initial video is less than or equal to the number of the plurality of video clips, and the color temperature of each target video clip may be beyond a preset color temperature range. That is, a video clip whose color temperature is within the color temperature range meets the expected display effect, and the terminal does not need to adjust the color temperature of the video clip. However, the target video clip whose color temperature is beyond the color temperature range does not meet the expected display effect, and the terminal needs to further adjust the color temperature of the video clip.

It can be understood that an expected display effect of the processed video clip may be determined according to requirements of application scenes. For example, the expected display effect may be a normal tone, a cool tone, or a warm tone. A color temperature of a video clip with the normal tone is generally 6000 K to 7000 K; a color temperature of a video clip with the cool tone is greater than 7000 K, that is, the color temperature is relatively high; and a color temperature of a video clip with the warm tone is generally less than 6000 K, that is, the color temperature is relatively low.

Exemplarily, in the case that the expected display effect of the processed video clip is the normal tone, the color temperature range may be 6000 K to 7000 K. The terminal may determine a video clip with a color temperature beyond the color temperature range (namely, a video clip with a relatively high or relatively low color temperature) as the target video clip. Referring to FIG. 4, the terminal may select m target video clips whose color temperatures need to be adjusted from n video clips through scene selection, wherein m is an integer not greater than n.

In 207, for each target video clip in the plurality of video clips, a color temperature adjustment coefficient of the target video clip is determined based on a color temperature of the target video clip and a color balance correction coefficient thereof.

In the embodiments of the present disclosure, an image processing algorithm for calculating the color balance correction coefficient of a video frame is pre-stored in the terminal. For each target video clip, the terminal can first calculate a color balance correction coefficient of at least one video frame in the target video clip by using the image processing algorithm, and then, determine the color balance correction coefficient of the target video clip based on the color balance correction coefficient of the at least one video frame. The color temperature adjustment coefficient of each target video clip may include: an R channel adjustment coefficient $K_R$, a G channel adjustment coefficient $K_G$, and a B channel adjustment coefficient $K_B$.

Optionally, the R channel adjustment coefficient $K_R$, the G channel adjustment coefficient $K_G$, and the B channel adjustment coefficient $K_B$ respectively satisfy:

$$K_R = CT' \times \beta_1 \times \text{Avg\_gain}'_R; \quad \text{Equation (2)}$$

$$K_G = CT' \times \beta_2 \times \text{Avg\_gain}'_G; \quad \text{Equation (3)}$$

and $$K_B = CT' \times \beta_3 \times \text{Avg\_gain}'_B. \quad \text{Equation (4)}$$

$\beta_1$, $\beta_2$ and $\beta_3$ are all preset color temperature reference coefficients; and values of the three color temperature reference coefficients may be adjusted according to an expected display effect of the target video clip and an image format of the video frames in the target video clip, and may range from 0 to 1/2000. CT' is the color temperature of the target video clip, and the value of CT' may range from 0 to 10000 K. $\text{Avg\_gain}'_R$ is a color balance correction coefficient of the target video clip on the R channel, $\text{Avg\_gain}'_G$ is a color balance correction coefficient of the target video clip on the G channel, and $\text{Avg\_gain}'_B$ is a color balance correction coefficient of the target video clip on the B channel. The values of the color balance correction coefficients of the three channels may range from 0 to 2.

Referring to the above equations (2), (3), and (4), it can be seen that all the color temperature adjustment coefficients (namely, $K_R$, $K_G$, and $K_B$) of the target video clip are positively correlated with the color temperature CT' of the target video clip and the color balance correction coefficients (namely, $\text{Avg\_gain}'_R$, $\text{Avg\_gain}'_G$, and $\text{Avg\_gain}'_B$) of the target video clip.

Optionally, the image processing algorithm pre-stored in the terminal for calculating the color balance correction coefficient of the video frame may be a gray world algorithm. For each target video clip in the plurality of video clips, the terminal may calculate the color balance correction coefficients of each video frame in the target video clip on the R channel, G channel, and B channel through the gray world algorithm. After that, the terminal may determine a mean value of the color balance correction coefficient of at least one video frame in the target video clip on the R channel as the color balance correction coefficient (namely, Avg_gain'$_R$ in the above equation (2)) of the target video clip on the R channel, a mean value of the color balance correction coefficient of the at least one video frame in the target video clip on the G channel as the color balance correction coefficient (namely, Avg_gain'$_G$ in the above equation (3)) of the target video clip on the G channel, and a mean value of the color balance correction coefficient of the at least one video frame in the target video clip on the B channel as the color balance correction coefficient (namely, Avg_gain'$_B$ in the above equation (4)) of the target video clip on the B channel.

Exemplarily, referring to FIG. 4, the process of calculating the color balance correction coefficient of each target video clip by the terminal may also be called a gain calculation process. Optionally, as shown in FIG. 4, the terminal may also perform gain calculation on all n video clips in the initial video.

For each target video clip in the plurality of video clips, the color balance correction coefficient gain$_R$ on the R channel, the color balance correction coefficient gain$_G$ on the G channel, and the color balance correction coefficient gain$_B$ on the B channel of each video frame in the target video clip respectively satisfy:

$$\text{gain}_R = K/R_{avg} + a; \quad \text{Equation (5)}$$

$$\text{gain}_G = K/G_{avg} + b; \quad \text{Equation (6)}$$

and $$\text{gain}_B = K/B_{avg} + c. \quad \text{Equation (7)}$$

$R_{avg}$ is a mean value of R pixel values of a plurality of pixels in the video frame, $G_{avg}$ is a mean value of G pixel values of the plurality of pixels in the video frame, $B_{avg}$ is a mean value of B pixel values of the plurality of pixels in the video frame, a, b, and c are preset reference deviation values, and K is a mean value of $R_{avg}$, $G_{avg}$, and $B_{avg}$.

It can be understood that the R pixel value of each pixel in the video frame is a channel value of the pixel on the R channel in the RGB color space, the G pixel value is a channel value of the pixel on the G channel in the RGB color space, and the B pixel value is a channel value of the pixel on the B channel in the RGB color space.

Referring to the above equations (5), (6), and (7), in order to enable the gray world algorithm to adapt to video frames with different image contents, the embodiments of the present disclosure add reference deviation values a, b, and c based on the gray world algorithm. The reference deviation values may be adjusted according to an image format, image content, and the like of each video frame in the initial video, such that the gray world algorithm can be more adapted to the video frames. For example, in the case that the plurality of video frames in the initial video are HDR images, the value of a may be 20, the value of b may be 10, and the value of c may be 0.

In 208, for each video frame in the target video clip, a pixel value of each pixel in the video frame is adjusted by using the color temperature adjustment coefficient of the target video clip.

In the embodiments of the present disclosure, for each video frame in the target video clip, the terminal may adjust the R pixel value of each pixel in the video frame by using the R channel adjustment coefficient, the G pixel value of each pixel in the video frame by using the G channel adjustment coefficient, and the B pixel value of each pixel in the video frame by using the B channel adjustment coefficient, and the channel adjustment coefficients are determined in the above 207.

It can be understood that a color temperature of a video frame can be adjusted by adjusting a pixel value of each pixel in the video frame. The color temperature adjustment of the video frame may also be called white balance processing of the video frame.

After the terminal adjusts the pixel value of each pixel in the video frame, the R pixel value $R_1$, the G pixel value $G_1$, and the B pixel value $B_1$ of the pixel respectively satisfy:

$$R_1 = K_R \times R_0; \quad \text{Equation (8)}$$

$$G_1 = K_G \times G_0; \quad \text{Equation (9)}$$

and $$B_1 = K_B \times B_0. \quad \text{Equation (10)}$$

$R_0$ is an R pixel value of a pixel before the terminal adjusts a pixel value of the pixel, $G_0$ is a G pixel value of the pixel before the terminal adjusts the pixel value of the pixel, and $B_0$ is a B pixel value of the pixel before the terminal adjusts the pixel value of the pixel. Based on the equations (8) to (10), it can be seen that the terminal may multiply the pixel value of each pixel with the color temperature adjustment coefficient of the corresponding channel, thereby achieving the adjustment of the pixel value of the pixel.

With reference to the above description, it can be seen that when the terminal adjusts the color temperature of the at least one video frame in each target video clip, the used color temperature adjustment coefficients (namely, $K_R$, $K_G$, and $K_B$) are the same, and the used color temperature adjustment coefficients of the video frames in the different target video clips are different. Since the color temperature adjustment coefficient of each target video clip is determined based on the mean value of the color temperature of the at least one video frame in the target video clip and the mean value of the color balance correction coefficients, when the color temperature of each video frame in the target video clip is adjusted by using the color temperature adjustment coefficients, a better adjusting effect of the target video clip can be ensured, thereby further ensuing a better display effect of the target video clip with the color temperature adjusted.

Exemplarily, referring to FIG. 4, for each of m target video clips, the terminal may adjust the color temperature of the target video clip based on the color temperature of the target video clip determined by the color temperature estimation in the above 203 to 205 and the color balance correction coefficient of the target video clip determined in the above 207.

In 209, a target video is acquired by splicing at least one target video clip with the color temperature adjusted and a video clip other than the at least one target video clip according to a playing order.

Exemplarily, referring to FIG. 4, the terminal may acquire the target video by splicing the m target video clips with the color temperature adjusted and the video clip, other than the m target video clips, in the n video clips according to the playing order.

It can be understood that the sequence of steps of the method for processing the video according to the embodiments of the present disclosure may be appropriately adjusted, and the steps may also be increased or decreased according to the situation. For example, the above 206 may be deleted according to a situation, that is, the terminal may directly adjust the color temperature of each of the plurality of video clips in the initial video without selecting the target video clip. Alternatively, it can be understood that each video clip in the initial video is the target video clip. Variations of the method readily conceivable for any person skilled in the art within the technical scope disclosed in the present disclosure should be covered by the scope of protection of the present disclosure, and therefore will not be repeated herein.

In summary, a method for processing a video is provided by the embodiments of the present disclosure. In the method for processing the video, a terminal can segment an initial video into a plurality of video clips, and calculate color temperatures of the plurality of video clips. For each target video clip in the plurality of video clips, the terminal can determine a color temperature adjustment coefficient of the target video clip based on a color temperature of the target video clip and a color balance correction coefficient thereof, and adjust a color temperature of at least one video frame in the target video clip by using the color temperature adjustment coefficient. Thus, a better color temperature adjustment effect of each video clip can be ensured, thereby ensuring a better display effect of the processed video clips.

Figure 6:
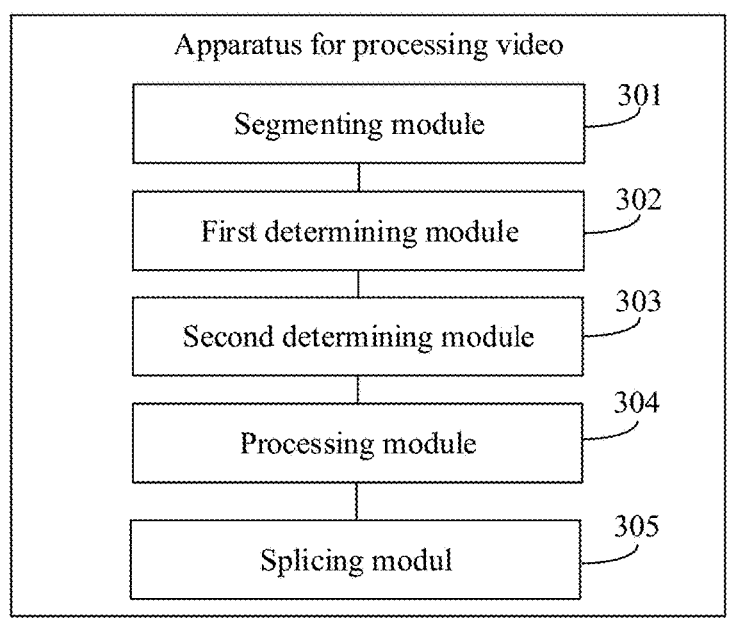
FIG. 6 is a schematic structural diagram of an apparatus for processing a video according to some embodiments of the present disclosure.

FIG. 6 is a schematic structural diagram of an apparatus for processing a video according to some embodiments of the present disclosure. The apparatus for processing the video may be deployed in the server 110 or the terminal 120 in the scene shown in FIG. 1 and may perform the method for processing the video according to the above method embodiments. As shown in FIG. 6, the apparatus includes the following modules.

A segmenting module 301 is configured to segment a plurality of video frames in an initial video into a plurality of video clips, wherein each of the plurality of video clips includes one or more video frames, and the plurality of video frames is consecutive.

A first determining module 302 is configured to determine, for each of the plurality of video clips, a color temperature of the video clip based on a color temperature of at least one video frame in the video clip.

A second determining module 303 is configured to determine, for each target video clip in the plurality of video clips, a color temperature adjustment coefficient of the target video clip based on a color temperature of the target video clip and a color balance correction coefficient of the target video clip, wherein the color temperature adjustment coefficient is positively correlated with both the color temperature and the color balance correction coefficient, and a number of the target video clips in the initial video is less than or equal to a number of the plurality of video clips.

A processing module 304 is configured to adjust, for each target video clip, a color temperature of each video frame in the target video clip by using the color temperature adjustment coefficient of the target video clip.

A splicing module 305 is configured to acquire a target video by splicing at least one target video clip with the color temperature adjusted and a video clip other than the at least one target video clip according to a playing order.

Optionally, the first determining module 302 is configured to perform, for each of the plurality of video clips, space conversion on each video frame in the video clip; determine a color temperature of the video clip based on a mean value of a plurality of pixels in the video frame subjected to the space conversion on each channel; and determine the color temperature of the video clip based on a mean value of the color temperature of the at least one video frame in the video clip.

Optionally, the first determining module 302 is configured to, for each of the plurality of video clips, convert each video frame in the video clip from an RGB color space to an HSV color space and a YUV color space separately.

For each video frame in the video clip, the color temperature of the video frame is determined based on the mean values of the plurality of pixels in the video frame on a Y channel, a U channel, and a V channel in the YUV color space as well as a mean value of the plurality of pixels on an S channel in the HSV color space, wherein the color temperature of the video frame is positively correlated with the mean values of the plurality of pixels in the video frame on the Y channel and the U channel, and is negatively correlated with the mean values of the plurality of pixels in the video frame on the V channel and the S channel.

Optionally, for each of the plurality of video clips, the color temperature CT of each video frame in the video clip satisfies:

$$CT = \alpha \times \frac{|Y_{mean} \times U_{mean}|}{|C_{minus} \times V_{mean} \times S_{mean}|^{0.1}};$$

wherein $\alpha$ is a preset gain coefficient, $Y_{mean}$ is the mean value on the Y channel, $U_{mean}$ is the mean value on the U channel, $V_{mean}$ is the mean value on the V channel, $C_{minus}$ is an absolute value of a difference value between $U_{mean}$ and $V_{mean}$, and $S_{mean}$ is the mean value on the S channel.

Optionally, the plurality of video frames in the initial video are HDR images, and the value of $\alpha$ is 5000.

Figure 7:
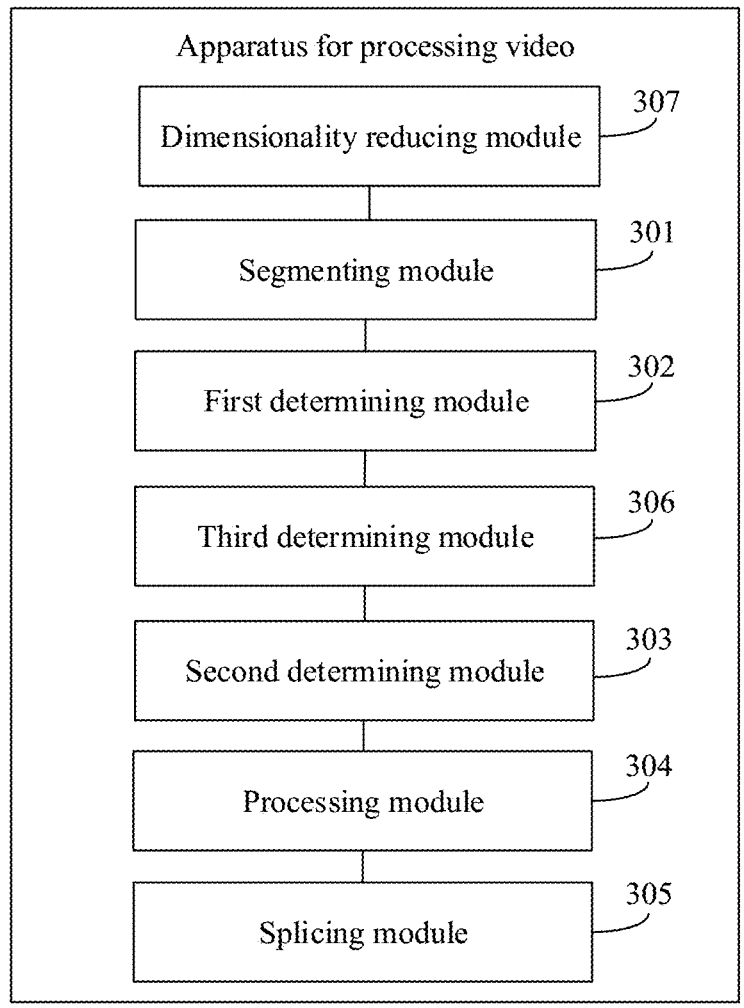
FIG. 7 is a schematic structural diagram of another apparatus for processing a video according to some embodiments of the present disclosure.

FIG. 7 is a schematic structural diagram of another apparatus for processing a video according to some embodiments of the present disclosure. Referring to FIG. 7, the apparatus for processing the video may further include: a third determining module 306 configured to determine the at least one target video clip from the plurality of video clips based on color temperatures of the plurality of video clips.

The color temperature of each target video clip is beyond a preset color temperature range.

Optionally, the color temperature ranges from 6000 K to 7000 K.

Optionally, for each target video clip in the plurality of video clips, the color temperature adjustment coefficient of the target video clip includes an R channel adjustment coefficient $K_R$, a G channel adjustment coefficient $K_G$, and a B channel adjustment coefficient $K_B$;

wherein the R channel adjustment coefficient $K_R$ satisfies:
$K_R = CT' \times \beta_1 \times Avg\_gain'_R$;
the G channel adjustment coefficient $K_G$ satisfies:
$K_G = CT' \times \beta_2 \times Avg\_gain'_G$; and
the B channel adjustment coefficient $K_B$ satisfies:
$K_B = CT' \times \beta_3 \times Avg\_gain'_B$;
wherein $\beta_1$, $\beta_2$ and $\beta_3$ are all preset color temperature reference coefficients, CT' is the color temperature of the target video clip, $Avg\_gain'_R$ is a color balance correction coefficient of the target video clip on an R channel, $Avg\_gain'_G$ is a color balance correction coefficient of the target video clip on a G channel, and Avg_gain'$_B$ is a color balance correction coefficient of the target video clip on a B channel.

Optionally, the processing module 304 is configured to:
adjust, for each video frame in the target video clip, an R pixel value of each pixel in the video frame by using the R channel adjustment coefficient K$_R$;
adjust, for each video frame in the target video clip, a G pixel value of each pixel in the video frame by using the G channel adjustment coefficient K$_G$; and
adjust, for each video frame in the target video clip, a B pixel value of each pixel in the video frame by using the B channel adjustment coefficient K$_B$.

Optionally, Avg_gain'$_R$ is a mean value of a color balance correction coefficient of at least one video frame in the target video clip on the R channel; Avg_gain'$_G$ is a mean value of a color balance correction coefficient of the at least one video frame in the target video clip on the G channel; and Avg_gain'$_B$ is a mean value of a color balance correction coefficient of the at least one video frame in the target video clip on the B channel.

Optionally, a color balance correction coefficient gain$_R$ of each video frame on the R channel satisfies: gain$_R$=K/R$_{avg}$+a;
a color balance correction coefficient gain$_G$ of each video frame on the G channel satisfies: gain$_G$=K/G$_{avg}$+b; and
a color balance correction coefficient gain$_B$ of each video frame on the B channel satisfies: gain$_B$=K/B$_{avg}$+c;
wherein R$_{avg}$ is a mean value of R pixel values of a plurality of pixels in the video frame, G$_{avg}$ is a mean value of G pixel values of the plurality of pixels in the video frame, B$_{avg}$ is a mean value of B pixel values of the plurality of pixels in the video frame, a, b, and c are preset reference deviation values, and K is a mean value of R$_{avg}$, G$_{avg}$, and B$_{avg}$.

Optionally, the plurality of video frames in the initial video are HDR images, the value of a is 20, the value of b is 10, and the value of c is 0.

Optionally, referring to FIG. 7, the segmenting module 301 is configured to:
sequentially calculate a similarity between each video frame and a previous video frame according to the playing order of the plurality of video frames in the initial video; and
segment the initial video into the plurality of video clips based on the calculated similarity between every two adjacent video frames.

Optionally, each video frame in the initial video includes a plurality of image blocks, and the segmenting module 301 is configured to:
determine at least one target image block in each video frame in the initial video, wherein a number of the at least one target image block is less than a number of the plurality of image blocks; and
sequentially calculate a similarity between at least one target image block in each video frame and at least one target image block in a previous video frame according to the playing order of the plurality of video frames in the initial video.
wherein a position of the at least one target image block in each video frame is the same as a position of the at least one target image block in the previous video frame.

Optionally, referring to FIG. 7, the apparatus for processing the video further includes: a dimensionality reducing module 307, configured to acquire the plurality of video frames by performing dimensionality reduction processing on each initial video frame in the initial video before the segmenting module 301 sequentially calculates the similarity between each video frame and the previous video frame according to the playing order of the plurality of video frames in the initial video.

Optionally, the segmenting module 301 is configured to:
determine a structural similarity between the video frame and the previous video frame based on a mean value of image data of the video frame and a mean value of image data of the previous video frame, a standard deviation of the image data of the video frame and a standard deviation of the image data of the previous video frame, and a covariance between the image data of the video frame and the image data of the previous video frame; and determine the similarity between the video frame and the previous video frame based on the structural similarity between the video frame and the previous video frame.

In summary, an apparatus for processing a video is provided by the embodiments of the present disclosure. The apparatus for processing the video can segment an initial video into a plurality of video clips, and calculate color temperatures of the plurality of video clips. For each target video clip in the plurality of video clips, the apparatus for processing the video can determine a color temperature adjustment coefficient of the target video clip based on a color temperature of the target video clip and a color balance correction coefficient thereof, and adjust a color temperature of at least one video frame in the target video clip by using the color temperature adjustment coefficient. Thus, a better color temperature adjustment effect of each video clip can be ensured, thereby ensuring a better display effect of the processed video.

It can be noted that the apparatus for processing the video according to the present embodiments only takes division of all the functional modules as an example for explanation. In practice, the above functions can be finished by the different functional modules as required. That is, the internal structure of the device is divided into different functional modules to finish all or part of the functions described above.

In addition, the apparatus for processing the video according to the present embodiments has the same concept as the method for processing the video according to the foregoing embodiments, and the specific implementation process thereof is detailed in the method embodiments, which will not be repeated herein.

A display device is further provided according to some embodiments of the present disclosure. The display device may be a computer device, for example, the server 110 or the terminal 120 in the scene shown in FIG. 1. In addition, the display device may include the apparatus for processing the video provided by the above apparatus embodiments.

Figure 8:
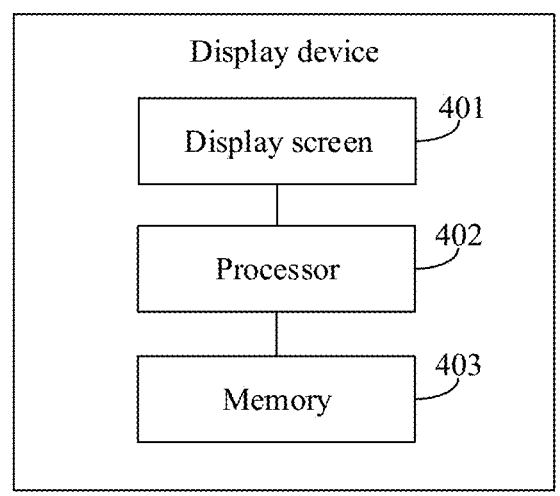
FIG. 8 is a schematic structural diagram of a display device according to some embodiments of the present disclosure.

As shown in FIG. 8, the display device may include: a display screen 401, a processor 402, and a memory 403 storing at least one instruction therein. The at least one instruction, when loaded and executed by the processor 402, causes the processor 402 to perform the method for processing the video (for example, the methods shown in FIGS. 2 and 3) provided by the above method embodiments. The display screen 401 may further play a processed video.

A computer-readable storage medium is further provided according to some embodiments of the present disclosure. At least one instruction is stored in the storage medium, and when the at least one instruction is loaded and executed by a processor, causes the processor to perform the method for processing the video (for example, the methods shown in FIGS. 2 and 3) provided by the above method embodiments.

A computer program product or a computer program is further provided according to some embodiments of the present disclosure. The computer program product or the computer program includes at least one computer instruction, wherein the at least one computer instruction, when loaded and executed by a processor, causes the processor to perform the method for processing the video (for example, the methods shown in FIGS. 2 and 3) provided by the above method embodiments.

It can be understood that the term "at least one" in the present disclosure refers to one or more, and the term "a plurality of" refers to two or more.

The terms "first", "second", and the like in the present disclosure are configured to distinguish the same or similar items with basically the same role and function. It should be understood that "first", "second" . . . , and "$n^{th}$" are not logically or chronologically dependent on each other, nor do they limit the number or the execution order.

Persons of ordinary skill in the art can understand that all or part of the steps described in the above embodiments can be completed through hardware, or through relevant hardware instructed by applications stored in a computer-readable storage medium, such as a read-only memory, a disk, or a CD.

The foregoing descriptions are merely preferred embodiments of the present disclosure, and are not intended to limit the present disclosure. Within the spirit and principles of the present disclosure, any modifications, equivalent substitutions, improvements, etc., are within the protection scope of the present disclosure.

The invention claimed is:

1. A method for processing a video, comprising:
segmenting a plurality of video frames in an initial video into a plurality of video clips, wherein each of the plurality of video clips comprises one or more video frames, and the plurality of video frames is consecutive;
determining, for each of the plurality of video clips, a color temperature of the video clip based on a color temperature of at least one video frame in the video clip;
determining, for each target video clip in the plurality of video clips, a color temperature adjustment coefficient of the target video clip based on a color temperature of the target video clip and a color balance correction coefficient of the target video clip, wherein the color temperature adjustment coefficient is positively correlated with both the color temperature and the color balance correction coefficient of the target video clip, and a number of the target video clips in the initial video is less than or equal to a number of the plurality of video clips;
adjusting, for each target video clip, a color temperature of each video frame in the target video clip by using the color temperature adjustment coefficient of the target video clip; and
acquiring a target video by splicing at least one target video clip with the color temperature adjusted and a video clip other than the at least one target video clip according to a playing order.

2. The method according to claim 1, wherein determining the color temperature of the video clip based on the color temperature of the at least one video frame in the video clip comprises:
performing space conversion on each video frame in the video clip;
determining a color temperature of the video frame based on a mean value of a plurality of pixels in the video frame subjected to the space conversion on each channel; and
determining the color temperature of the video clip based on a mean value of the color temperature of the at least one video frame in the video clip.

3. The method according to claim 2, wherein performing the space conversion on each video frame in the video clip comprises:
converting each video frame in the video clip from a red-green-blue (RGB) color space to a hue-saturation-value (HSV) color space and a luminance-chrominance (YUV) color space separately;
determining the color temperature of the video frame based on the mean value of the plurality of pixels in the video frame subjected to the space conversion on each channel comprises:
determining, for each video frame in the video clip, the color temperature of the video frame based on mean values of the plurality of pixels in the video frame on a Y channel, a U channel, and a V channel in the YUV color space as well as a mean value of the plurality of pixels on an S channel in the HSV color space, wherein the color temperature of the video frame is positively correlated with the mean values of the plurality of pixels in the video frame on the Y channel and the U channel, and is negatively correlated with the mean values of the plurality of pixels in the video frame on the V channel and the S channel.

4. The method according to claim 3, wherein the color temperature CT of the video frame satisfies:

$$CT = \alpha \times \frac{|Y_{mean} \times U_{mean}|}{|C_{minus} \times V_{mean} \times S_{mean}|^{0.1}};$$

wherein $\alpha$ is a preset gain coefficient, $Y_{mean}$ is the mean value on the Y channel, $U_{mean}$ is the mean value on the U channel, $V_{mean}$ is the mean value on the V channel, $C_{minus}$ is an absolute value of a difference value between $U_{mean}$ and $V_{Mean}$, and $S_{mean}$ is the mean value on the S channel.

5. The method according to claim 1, wherein prior to determining the color temperature adjustment coefficient of the target video clip, the method further comprises:
determining the at least one target video clip from the plurality of video clips based on the color temperatures of the plurality of video clips,
wherein the color temperature of each target video clip is beyond a preset color temperature range.

6. The method according to claim 1, wherein the color temperature adjustment coefficient of the target video clip comprises an R channel adjustment coefficient $K_R$, a G channel adjustment coefficient $K_G$, and a B channel adjustment coefficient $K_B$,
wherein the R channel adjustment coefficient $K_R$ satisfies: $K_R = CT' \times \beta_1 \times Avg\_gain'_R$;
the G channel adjustment coefficient $K_G$ satisfies: $K_G = CT' \times \beta_2 \times Avg\_gain'$; and
the B channel adjustment coefficient $K_G$ satisfies: $K_G = CT' - \beta_3 \times Avg\_gain'$;
wherein $\beta_1$, $\beta_2$ and $\beta_3$ are all preset color temperature reference coefficients, CT' is the color temperature of the target video clip, $Avg\_gain'_R$ is a color balance correction coefficient of the target video clip on an R channel, Avg_gain'$_G$ is a color balance correction coefficient of the target video clip on a G channel, and Avg_gain'$_B$ is a color balance correction coefficient of the target video clip on a B channel.

7. The method according to claim 6, wherein adjusting the color temperature of each video frame in the target video clip by using the color temperature adjustment coefficient of the target video clip comprises:
   adjusting, for each video frame in the target video clip, an R pixel value of each pixel in the video frame by using the R channel adjustment coefficient K$_G$;
   adjusting, for each video frame in the target video clip, a G pixel value of each pixel in the video frame by using the G channel adjustment coefficient K$_G$; and
   adjusting, for each video frame in the target video clip, a B pixel value of each pixel in the video frame by using the B channel adjustment coefficient K$_G$.

8. The method according to claim 6, wherein Avg_gain'$_R$ is a mean value of a color balance correction coefficient of at least one video frame in the target video clip on the R channel;
   Avg_gain'$_G$ is a mean value of a color balance correction coefficient of the at least one video frame in the target video clip on the G channel; and
   Avg_gain'$_B$ is a mean value of a color balance correction coefficient of the at least one video frame in the target video clip on the B channel.

9. The method according to claim 8, wherein a color balance correction coefficient gain, of each video frame on the R channel satisfies: gain$_R$=K/R$_{avg}$+a;
   a color balance correction coefficient gain, of each video frame on the G channel satisfies: gain$_G$=K/G$_{avg}$+b; and
   a color balance correction coefficient gain, of each video frame on the B channel satisfies: gain$_B$=K/B$_{avg}$+C;
   wherein R$_{avg}$ is a mean value of R pixel values of a plurality of pixels in the video frame, G$_{avg}$ is a mean value of G pixel values of the plurality of pixels in the video frame, B$_{avg}$ is a mean value of B pixel values of the plurality of pixels in the video frame, a, b, and c are preset reference deviation values, and K is a mean value of R$_{avg}$, G$_{avg}$, and B$_{avg}$.

10. The method according to claim 1, wherein segmenting the plurality of video frames in the initial video into the plurality of video clips comprises:
    sequentially calculating a similarity between each video frame and a previous video frame according to the playing order of the plurality of video frames in the initial video; and
    segmenting the initial video into the plurality of video clips based on the calculated similarity between every two adjacent video frames.

11. The method according to claim 10, wherein each video frame in the initial video comprises a plurality of image blocks, and sequentially calculating the similarity between each video frame and the previous video frame according to the playing order of the plurality of video frames in the initial video comprises:
    determining at least one target image block in each video frame in the initial video, wherein a number of the at least one target image block is less than a number of the plurality of image blocks; and
    sequentially calculating a similarity between at least one target image block in each video frame and at least one target image block in a previous video frame according to the playing order of the plurality of video frames in the initial video,
    wherein a position of the at least one target image block in each video frame is a same as a position of the at least one target image block in the previous video frame.

12. The method according to claim 10, wherein prior to sequentially calculating the similarity between each video frame and the previous video frame according to the playing order of the plurality of video frames in the initial video, the method further comprises:
    acquiring the plurality of video frames by performing dimensionality reduction processing on each initial video frame in the initial video.

13. The method according to claim 10, wherein sequentially calculating the similarity between each video frame and the previous video frame comprises:
    determining, for each of the plurality of video frames, a structural similarity between the video frame and the previous video frame based on a mean value of image data of the video frame and a mean value of image data of the previous video frame, a standard deviation of the image data of the video frame and a standard deviation of the image data of the previous video frame, and a covariance between the image data of the video frame and the image data of the previous video frame; and
    determining the similarity between the video frame and the previous video frame based on the structural similarity between the video frame and the previous video frame.

14. An apparatus for processing a video, comprising:
    a processor; and
    a memory configured to store one or more instructions executable by the processor;
    wherein the processor, when loading and executing the one or more instructions, is caused to perform:
    segmenting a plurality of video frames in an initial video into a plurality of video clips, wherein each of the plurality of video clips comprises one or more video frames, and the plurality of video frames is consecutive;
    determining, for each of the plurality of video clips, a color temperature of the video clip based on a color temperature of at least one video frame in the video clip;
    determining, for each target video clip in the plurality of video clips, a color temperature adjustment coefficient of the target video clip based on a color temperature of the target video clip and a color balance correction coefficient of the target video clip, wherein the color temperature adjustment coefficient is positively correlated with both the color temperature and the color balance correction coefficient of the target video clip, and a number of the target video clips in the initial video is less than or equal to a number of the plurality of video clips;
    adjusting, for each target video clip, a color temperature of each video frame in the target video clip by using the color temperature adjustment coefficient of the target video clip; and
    acquiring a target video by splicing at least one target video clip with the color temperature adjusted and a video clip other than the at least one target video clip according to a playing order.

15. A display device, comprising: a display screen, a processor, and a memory storing at least one instruction, wherein the at least one instruction, when loaded and executed by the processor, causes the processor to perform:

segmenting a plurality of video frames in an initial video into a plurality of video clips, wherein each of the plurality of video clips comprises one or more video frames, and the plurality of video frames is consecutive;

determining, for each of the plurality of video clips, a color temperature of the video clip based on a color temperature of at least one video frame in the video clip;

determining, for each target video clip in the plurality of video clips, a color temperature adjustment coefficient of the target video clip based on a color temperature of the target video clip and a color balance correction coefficient of the target video clip, wherein the color temperature adjustment coefficient is positively correlated with both the color temperature and the color balance correction coefficient of the target video clip, and a number of the target video clips in the initial video is less than or equal to a number of the plurality of video clips;

adjusting, for each target video clip, a color temperature of each video frame in the target video clip by using the color temperature adjustment coefficient of the target video clip; and acquiring a target video by splicing at least one target video clip with the color temperature adjusted and a video clip other than the at least one target video clip according to a playing order.

16. A non-transitory computer-readable storage medium storing at least one instruction, wherein the at least one instruction, when loaded and executed by a processor, causes the processor to perform the method for processing the video as defined in claim 1.

17. The apparatus according to claim 14, wherein the processor, when loading and executing the one or more instructions, is caused to perform:

performing space conversion on each video frame in the video clip;

determining a color temperature of the video frame based on a mean value of a plurality of pixels in the video frame subjected to the space conversion on each channel; and determining the color temperature of the video clip based on a mean value of the color temperature of the at least one video frame in the video clip.

18. The apparatus according to claim 17, wherein the processor, when loading and executing the one or more instructions, is caused to perform:

converting each video frame in the video clip from a red-green-blue (RGB) color space to a hue-saturation-value (HSV) color space and a luminance-chrominance (YUV) color space separately;

determining, for each video frame in the video clip, the color temperature of the video frame based on mean values of the plurality of pixels in the video frame on a Y channel, a U channel, and a V channel in the YUV color space as well as a mean value of the plurality of pixels on an S channel in the HSV color space, wherein the color temperature of the video frame is positively correlated with the mean values of the plurality of pixels in the video frame on the Y channel and the U channel, and is negatively correlated with the mean values of the plurality of pixels in the video frame on the V channel and the S channel.

19. The apparatus according to claim 18, wherein the color temperature CT of the video frame satisfies:

$$CT = \alpha \times \frac{|Y_{mean} \times U_{mean}|}{|C_{minus} \times V_{mean} \times S_{mean}|^{0.1}};$$

wherein $\alpha$ is a preset gain coefficient, $Y_{mean}$ is the mean value on the Y channel, $U_{mean}$ is the mean value on the U channel, $V_{mean}$ is the mean value on the V channel, $C_{minus}$ is an absolute value of a difference value between $U_{mean}$ and $V_{mean}$, and $S_{mean}$ is the mean value channel.

* * * * *